Whitmore & Arvin,
Corn Planter.
No. 110,811. Patented Jan. 3, 1871.
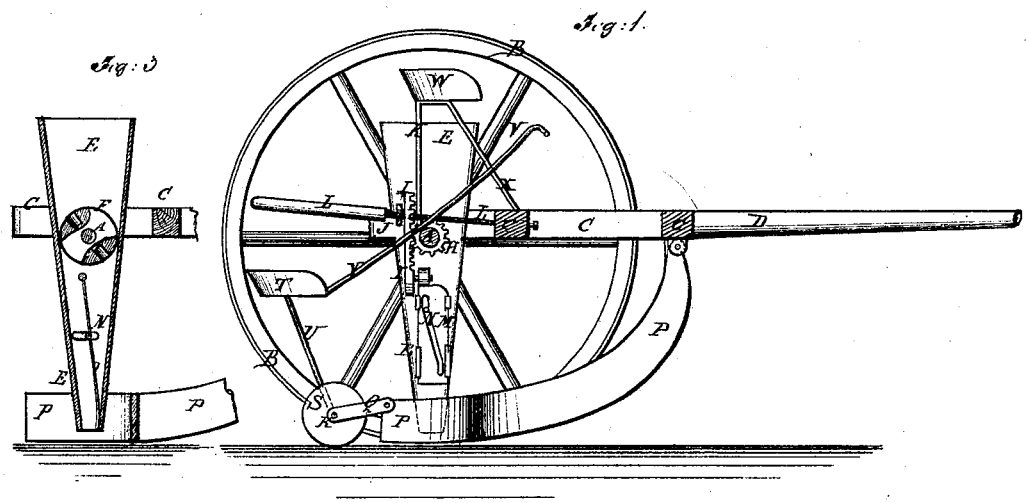
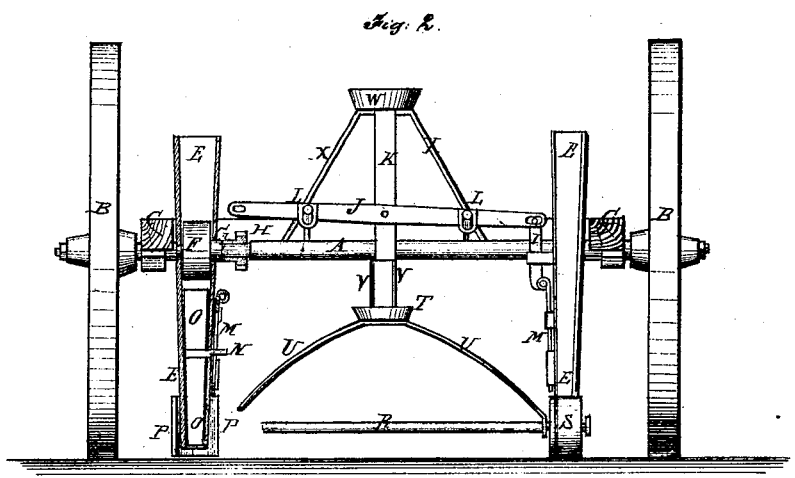
Witnesses:
Chas. Nida.
L. S. Mabee.
Inventor:
J. H. Whitmore
J. N. Arvin
per
Munn & Co
Attorneys.

United States Patent Office.

JOSEPH M. WHITMORE AND JOHN N. ARVIN, OF VALPARAISO, INDIANA.

Letters Patent No. 110,811, dated January 3, 1871.

IMPROVEMENT IN CORN-PLANTERS.

The Schedule referred to in these Letters Patent and making part of the same.

*To all whom it may concern:*

Be it known that we, JOSEPH M. WHITMORE and JOHN N. ARVIN, of Valparaiso, in the county of Porter and State of Indiana, have invented a new and useful Improvement in Corn-Planter; and we do hereby declare that the following is a full, clear, and exact description thereof, which will enable others skilled in the art to make and use the same, reference being had to the accompanying drawing forming part of this specification, in which—

Figure 1 is a detail vertical longitudinal section of our improved planter.

Figure 2 is a rear view of the same, partly in section, to show the construction.

Figure 3 is a detail sectional view of the same.

Similar letters of reference indicate corresponding parts.

Our invention relates to corn-planters, and consists in the improvements hereinafter described, and then pointed out in the claims.

A is the axle, upon the journals of which the wheels B are placed and revolve, the said axle being stationary.

C is the frame, which rests upon and is secured to the stationary axle A, and to the middle part of which the tongue D is securely attached.

E are the seed-hoppers through which the axle A passes, and which are also connected with the frame C.

The lower parts of the seed-hoppers E are made tapering, and are extended downward to serve as spouts to conduct the seed to the ground. By this construction the lower ends of the said hoppers or spouts do not require to be supported.

F are the dropping-wheels, which work loosely upon the axle A within the hoppers E, and which have recesses formed in their opposite sides, as shown in fig. 3, of sufficient capacity to contain enough seed to form a hill.

The dropping-wheels F are rigidly connected with sleeves G, placed upon the axle A, and which project through the inner sides of the hoppers E, and have small gear-wheels H attached to their projecting ends.

Into the teeth of the gear-wheels H mesh the teeth of the rack-bars I, which work up and down in guides attached to the hoppers E or axle A, or to both.

To the upper ends of the rack-bars I are attached pins, which pass through slots in the ends of the horizontal bar J, so that the rack-bars I may move up and down vertically while the ends of the horizontal bar J are moving in the arc of a circle.

The horizontal bar J is pivoted, at its middle part, to the standard K, that supports the driver's seat, and which is attached to the middle of the axle A, or to some other suitable support attached to the said axle A or to the frame C.

By this construction, by vibrating the bar J the dropping-wheels F will be oscillated to drop the corn alternately from the recesses in their opposite sides.

The bar J is vibrated by the hand-levers L, the forward ends of which are pivoted to a cross-bar of the frame C, and which pass through keepers or eyes attached to or formed in the said bar J.

To the lower ends of the rack-bars I are pivoted the upper ends of the slides M, which move up and down along the inner sides of the hoppers E, and which are kept in place by guides or keepers attached to said hoppers.

In the slides M are formed diagonal slots, as shown in fig. 1, to receive the projecting end of the pin N, which projects through a transverse slot in the side of the said hoppers, and the inner ends of which are secured to the flap or plate O, placed in the lower part of the hoppers E, and the upper end of which is pivoted to the sides of the hoppers E just below the middle part of the dropping-wheels F.

By this construction, as the rack-bar I moves in one direction to turn the dropping-wheel F to discharge the seed from the full recess of said wheel, the plate O is moved to the side of the hopper directly beneath said recess to receive and collect the seed so that it may be dropped to the ground in a bunch when the plate O is moved to the other side of the hopper to receive the seed from the other recess.

P are the openers or shoes by which the furrow is opened to receive the seed, the forward ends of which are curved upward and are pivoted to the forward part of the frame C, so that the said openers may adjust themselves to the surface of the ground independently of the wheels B, and so that the said shoes or openers may be readily raised from the ground when desired, for convenience in turning or in passing from place to place.

The rear ends of the openers P are made forked or branched, as shown in figs. 2 and 3, to spread the sides of the furrows and receive the lower ends of the hoppers, so that the seed may be deposited in the bottoms of the furrows before the sides of said furrows have fallen in.

The lower ends of the hoppers E thus serve as guides to the openers P to prevent a lateral movement, while allowing the said openers to move up and down freely and independently to adjust themselves to the surface of the ground.

To the upper parts of the rear ends of the branches of the openers P are pivoted the forward ends of the connecting-bars Q, the rear ends of which are pivoted to the rod or bar R, upon each side of each of the covering-rollers S, which revolve upon journals formed upon each end of said rod or bar R.

T is the seat for the man that operates the dropping device, and which is attached to and supported by the bar or bars U, the lower ends of which are attached to the bar or rod R.

The seat T is kept in an erect position by the lever V, the rear end of which is attached to the said seat T, and which is pivoted to the upright K or axle A.

The forward end of the lever V extends forward into such a position that the driver, from the seat W, can, with his feet, reach the said lever V, and operate it to raise the covering-rollers S and openers P away from the ground, for convenience in turning or passing from place to place.

The driver's seat W is attached to the upper end of the upright K, and is further secured in place by the braces X, the upper ends of which are attached to said seat and their lower ends are attached to the frame C.

The upright K and braces X are made of such a length as to raise the seat W to such a height that the driver can readily see to properly guide his machine.

Having thus described our invention,

We claim as new and desire to secure by Letters Patent—

1. A diagonally-slotted and reciprocating slide M, applied perpendicularly to the pin N of flap O, as and for the purpose described.

2. The combination of levers L L and bar J with sleeves G G, pinions H H, and rack-bars I I, when arranged and operated as described.

3. The combination of a rack-bar, I I, sleeve G, pinion H, and pin N, with dropper F and flap O, as and for the purpose described.

4. The runners P P, pivoted in front and resting directly beneath the axle, and the covering-rolls S S attached thereto, combined with mechanism U T V, extending in front of the driver's seat and within reach of his feet, as and for the purpose described.

JOSEPH M. WHITMORE.
JOHN N. ARVIN.

Witnesses:
G. A. PIERCE,
A. D. BARTHOLOMEW.